(12) United States Patent
Kim

(10) Patent No.: US 9,705,132 B2
(45) Date of Patent: Jul. 11, 2017

(54) OLIVINE OXIDE-CONTAINING POSITIVE ACTIVE MATERIAL FOR RECHARGEABLE LITHIUM BATTERY WITH IMPROVED ELECTRO-CONDUCTIVITY, RATE CHARACTERISTICS AND CAPACITY CHARACTERISTICS, METHOD FOR MANUFACTURING THE SAME, AND RECHARGEABLE LITHIUM BATTERY INCLUDING THE SAME

(75) Inventor: Ji-Hyun Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 514 days.

(21) Appl. No.: 13/194,800

(22) Filed: Jul. 29, 2011

(65) Prior Publication Data

US 2012/0135309 A1 May 31, 2012

(30) Foreign Application Priority Data

Nov. 25, 2010 (KR) ........................ 10-2010-0118329

(51) Int. Cl.
| | |
|---|---|
| H01M 4/58 | (2010.01) |
| H01M 4/136 | (2010.01) |
| H01M 4/62 | (2006.01) |
| H01M 10/0525 | (2010.01) |

(52) U.S. Cl.
CPC ......... *H01M 4/5825* (2013.01); *H01M 4/136* (2013.01); *H01M 4/624* (2013.01); *H01M 4/626* (2013.01); *H01M 4/625* (2013.01); *H01M 10/0525* (2013.01); *Y02E 60/122* (2013.01); *Y02P 70/54* (2015.11)

(58) Field of Classification Search
USPC ....... 429/218.1, 229, 231.95, 221, 220, 223, 429/224, 231.5, 231.6, 231.8; 252/182.1; 977/948; 427/77, 113
See application file for complete search history.

(56) References Cited

U.S. PATENT DOCUMENTS

| | | | |
|---|---|---|---|
| 8,236,449 B2 | 8/2012 | Nakura | |
| 8,497,215 B2 * | 7/2013 | Doll | H01L 31/0392 216/101 |
| 8,841,014 B1 * | 9/2014 | Deshpande et al. | 429/102 |
| 9,401,443 B2 * | 7/2016 | Ahmed | C25D 3/54 |
| 2004/0258836 A1 | 12/2004 | Besenhard et al. | |
| 2009/0050859 A1 * | 2/2009 | Liu et al. | 252/520.2 |
| 2009/0117020 A1 * | 5/2009 | Manthiram et al. | 423/274 |
| 2009/0278158 A1 * | 11/2009 | Fukunaga et al. | 257/99 |
| 2009/0309159 A1 * | 12/2009 | Morita | H01L 21/823814 257/347 |
| 2011/0086274 A1 | 4/2011 | Chang et al. | |
| 2012/0305887 A1 * | 12/2012 | Wang et al. | 257/13 |

FOREIGN PATENT DOCUMENTS

| | | |
|---|---|---|
| CN | 1903707 A | 1/2007 |
| CN | 101339995 A | 1/2009 |
| JP | 11-016566 A | 1/1999 |
| JP | 2001-110414 A | 4/2001 |
| JP | 2001-110414 A | 4/2001 |
| JP | 2005-034306 A | 2/2008 |
| JP | 2008-034306 A | 2/2008 |
| JP | 2011-210490 A | 10/2011 |
| KR | 1020030093166 A | 12/2003 |
| KR | 1020040096203 A | 11/2004 |
| KR | 10-2005-0000353 A | 1/2005 |
| KR | 10-0515029 B1 | 9/2005 |
| KR | 10-2010-0081955 | 7/2010 |

OTHER PUBLICATIONS

Office Action dated Apr. 23, 2013, issued in connection with Japanese Patent Application No. 2011-174684.
Extended European Search Report issued by the European Patent Office dated May 18, 2012, 8 pages.
Atef Y. Shenouda, Hua K. Liu, Studies on Electrochemical Behaviour of Zinc-doped LifePO4 for Lithium Battery Positive Electrode, Journal, 2009, 498-503, vol. 477, Journal of Alloys and Compounds, www.elsevier.com/locate/jallcom.
K.S. Park, J.T. Son, H.T. Chung, S.J. Kim, C.H. Lee, K.T. Kang, H.G. Kim, Surface Modification by Silver Coating for Improving Electrochemical Properties of LiFePO4, 2004, 311-314, vol. 129, Solid State Communications.
C.H. Mi, Y.X. Cao, X.G. Zhang, X.B. Zhao an H.L. Li, Synthesis and Characterization of LifePO4/(Ag+C) composite cathodes with nano-carbon webs; 2008, 301-306, vol. 181, ScienceDirect.
B. León, C. Pérez Vicente, J.J. Tirado, PH. Biensan and C. Tessier, Optimized Chemical Stability and Electrochemical Performance of LiFePO4 Composite Materials Obtained by ZnO Coating, Journal, 2008, A211-A216, vol. 155 (3), Journal of the Electrochemical Society.
F. Croce, A. D' Epifanio, J. Hassoun, A. Deptula, T. Olczac and B. Scrosati, A Novel Concept for the Synthesis of an Improved LifePO4 Lithium Battery Cathode, Letters, 2002, A47-A50, vol. 5 (3), Electrochemical and Solid-State Letters.
KIPO Office Action issued by the Korean Patent Office dated Sep. 17, 2012, 5 pages.
Chinese Office Action dated Nov. 27, 2013, issued in connection with corresponding Chinese Patent Application No. 201110307828. 8.
European Office Action issued by the European Patent Office dated Mar. 6, 2012, 3 pages.
Korean Office Action dated Oct. 18, 2012, 5 pages.
Chinese Second Office Action dated May 16, 2014, issued in connection with corresponding Chinese Patent Application No. 201110307828.8.
Office Action dated Oct. 15, 2014, issued in connection with corresponding Chinese Application No. 201110307828.8.

\* cited by examiner

*Primary Examiner* — Raymond Alejandro
(74) *Attorney, Agent, or Firm* — Knobbe Martens Olson & Bear LLP

(57) ABSTRACT

A rechargeable lithium battery with improved electro-conductivity and improved rate characteristics and capacity characteristics is disclosed. The battery includes a positive active material that includes an olivine-type composite oxide; and a metal or an alloy thereof adhered to a surface of the olivine-type composite oxide, wherein the metal or the alloy is selected from the group consisting of germanium (Ge), zinc (Zn), gallium (Ga), and a combination thereof.

4 Claims, 1 Drawing Sheet

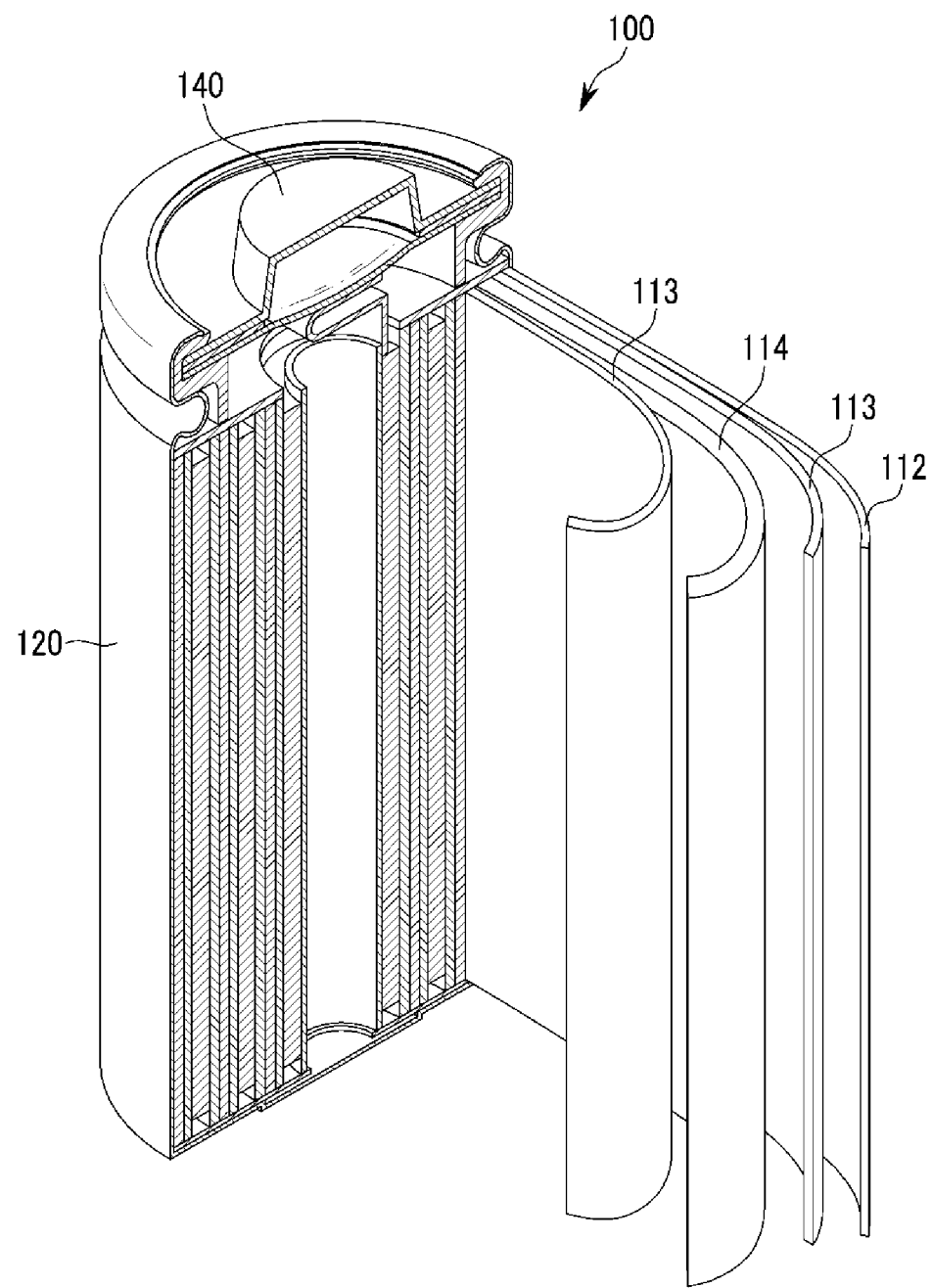

OLIVINE OXIDE-CONTAINING POSITIVE ACTIVE MATERIAL FOR RECHARGEABLE LITHIUM BATTERY WITH IMPROVED ELECTRO-CONDUCTIVITY, RATE CHARACTERISTICS AND CAPACITY CHARACTERISTICS, METHOD FOR MANUFACTURING THE SAME, AND RECHARGEABLE LITHIUM BATTERY INCLUDING THE SAME

CROSS-REFERENCE TO RELATED APPLICATIONS

This application claims priority to and the benefit of Korean Patent Application No. 10-2010-0118329 filed in the Korean Intellectual Property Office on Nov. 25, 2010, the entire contents of which are incorporated herein by reference.

BACKGROUND

Field

This disclosure relates to a positive active material for a rechargeable lithium battery, a method of manufacturing the same, and a rechargeable lithium battery including the same.

Description of the Related Technology

In recent times, due to reductions in size and weight of portable electronic equipment, there has been a need to develop batteries for portable electronic equipment that have both high performance and large capacity. Batteries generate electrical power using an electrochemical reaction material for a positive electrode and a negative electrode. Rechargeable lithium batteries generate electrical energy from changes of chemical potential, when lithium ions are intercalated/deintercalated at the positive and negative electrodes.

Rechargeable lithium batteries include materials that reversibly intercalate or deintercalate lithium ions during charge and discharge reactions as both positive and negative active materials, and an organic electrolyte or a polymer electrolyte.

For the positive active material for a rechargeable lithium battery, composite metal oxides such as $LiCoO_2$, $LiMn_2O_4$, $LiNiO_2$, $LiNi_{1-x}Co_xO_2$ (0<x<1), $LiMnO_2$, olivine compounds, and so on have been researched. Manganese-based positive active materials such as $LiMn_2O_4$ and $LiMnO_2$ are easy to synthesize, cost less than other materials, have excellent thermal stability compared to other active materials, and are environmentally friendly.

However, these manganese-based materials have relatively low capacity. $LiCoO_2$ has good electrical conductivity, a high cell voltage of about 3.7V, and excellent cycle-life, stability, and discharge capacity, and thus is a representative material. However, $LiCoO_2$ is expensive and can constitute more than 30% of the cost of a battery, and thus may cause a product employing such to lose price competitiveness.

In addition, $LiNiO_2$ has the highest discharge capacity among the above positive active materials, but is hard to synthesize. Furthermore, since nickel is highly oxidized, it may deteriorate the cycle-life of a battery and an electrode, and may have a problem of severe self discharge and reversibility deterioration. Further, it may be difficult to commercialize due to incomplete stability.

SUMMARY

One aspect of the present embodiments provides an olivine-type positive active material for a rechargeable lithium battery having high electrical conductivity.

Another aspect of the present embodiments provides a method of manufacturing the positive active material for a rechargeable lithium battery.

Yet another embodiment provides a rechargeable lithium battery including the positive active material.

According to one aspect of the present embodiments, an positive active material for a rechargeable lithium battery is provided that includes an olivine-type composite oxide; and a metal or an alloy thereof adhered to a surface of the olivine-type composite oxide, wherein the metal or the alloy is selected from the group consisting of germanium (Ge), zinc (Zn), gallium (Ga), and a combination thereof.

The olivine-type composite oxide may be represented by the following Chemical Formula 1.

$$Li_xM_yM'_zXO_{4-w}A_w \qquad \text{[Chemical Formula 1]}$$

In Chemical Formula 1,

M and M' are independently selected from the group consisting of iron (Fe), aluminum (Al), boron (B), cobalt (Co), chromium (Cr), copper (Cu), gallium (Ga), germanium (Ge), hafnium (Hf), magnesium (Mg), manganese (Mn), molybdenum (Mo), niobium (Nb), nickel (Ni), tin (Sn), titanium (Ti), vanadium (V), zinc (Zn), zirconium (Zr), and a combination thereof, X is selected from the group consisting of phosphorus (P), arsenic (As), bismuth (Bi), molybdenum (Mo), antimony (Sb), and a combination thereof, A is selected from the group consisting of fluorine (F), sulfur (S), and a combination thereof, 0<x≤1.3, 0<y≤1, 0<z≤1, 0<x+y+z≤2, and 0<w≤0.5.

The olivine-type composite oxide may include lithium iron phosphate represented by the following Chemical Formula 2.

$$LiFePO_4 \qquad \text{[Chemical Formula 2]}$$

The positive active material for a rechargeable lithium battery may further include a carbon coating layer on the surface.

The carbon coating layer may include a carbon selected from the group consisting of carbon nanotube, carbon nanorod, carbon nanowire, denka black, ketjen black, and a combination thereof.

According to another aspect of the present embodiments, a method of manufacturing a positive active material for a rechargeable lithium battery is provided that includes mixing a metal oxide with a olivine-type composite oxide precursor; and firing the mixture, wherein the metal oxide being capable of reducing into a metal at about 600° C. to about 800° C.

The metal oxide is selected from the group consisting of germanium oxide ($GeO_2$), zinc oxide (ZnO), gallium oxide ($GaO_2$), and a combination thereof.

The firing temperature may range from about 600° C. to about 800° C.

The firing may be performed under a reduction atmosphere.

The firing may be performed under the air after injecting a reducing agent.

The firing may be performed for about 8 hours to about 20 hours.

The olivine-type composite oxide precursor may include lithium (Li) raw material, iron (Fe) raw material, and phosphoric acid ($PO_4$) raw material.

The metal oxide may be added in about 3 parts by weight to about 40 parts by weight based on total 100 parts by weight of olivine-type composite oxide precursor.

The olivine-type composite oxide may be lithium iron phosphate represented by the following Chemical Formula 2:

LiFePO$_4$ [Chemical Formula 2]

The method of manufacturing the positive active material for a rechargeable lithium battery may further includes adding a carbon precursor material into the olivine-type composite oxide precursor together with the metal oxide.

The carbon precursor material may be selected from the group consisting of sucrose, glycol, glycerin, kerosene, and a combination thereof.

According to further another aspect of the present embodiments, a rechargeable lithium battery is provided that includes a positive electrode including the positive active material; a negative electrode including a negative active material; and an electrolyte.

By using the positive active material for a rechargeable lithium battery, it has high electro-conductivity, so that it may provide a rechargeable lithium battery with excellent rate characteristics and capacity characteristics.

BRIEF DESCRIPTION OF THE DRAWING

FIG. 1 is a schematic view of a rechargeable lithium battery according to one embodiment.

DETAILED DESCRIPTION

Example embodiments of the present disclosure will hereinafter be described in detail. However, these embodiments are only examples, and the present embodiments are not limited thereto.

The positive active material for a rechargeable lithium battery according to one embodiment includes an olivine-type composite oxide; and a metal or an alloy thereof adhered to a surface of the olivine-type composite oxide, wherein the metal or the alloy is selected from the group consisting of germanium (Ge), zinc (Zn), gallium (Ga), and a combination thereof.

The metal or the alloy is deposited on the olivine-type composite oxide, and it has high conductivity to increase the electrical conductivity of positive active material surface.

The olivine-type composite oxide may be represented by the following Chemical Formula 1.

Li$_x$M$_y$M'$_z$XO$_{4-w}$A$_w$ [Chemical Formula 1]

In Chemical Formula 1,

M and M' are independently selected from the group consisting of iron (Fe), aluminum (Al), boron (B), cobalt (Co), chromium (Cr), copper (Cu), gallium (Ga), germanium (Ge), hafnium (Hf), magnesium (Mg), manganese (Mn), molybdenum (Mo), niobium (Nb), nickel (Ni), tin (Sn), titanium (Ti), vanadium (V), zinc (Zn), zirconium (Zr), and a combination thereof, X is selected from the group consisting of phosphorus (P), arsenic (As), bismuth (Bi), molybdenum (Mo), antimony (Sb), and a combination thereof, A is selected from the group consisting of fluorine (F), sulfur (S), and a combination thereof, $0<x\leq1.3$, $0<y\leq1$, $0<z\leq1$, $0<x+y+z\leq2$, and $0<w\leq0.5$.

The olivine-type composite oxide may include lithium iron phosphate represented by the following Chemical Formula 2.

LiFePO$_4$ [Chemical Formula 2]

The positive active material for a rechargeable lithium battery may further include a carbon coating layer on its surface. The carbon coating layer may be mixed with the metal or the alloy thereof.

The carbon coating layer may further improve the electrical conductivity of positive active material together with the metal or the alloy thereof.

The carbon coating layer may include a carbon selected from the group consisting of carbon nanotube, carbon nanorod, carbon nanowire, denka black, ketjen black, and a combination thereof.

The method of manufacturing a positive active material for a rechargeable lithium battery according to one embodiment includes mixing a metal oxide with an olivine-type composite oxide precursor; and firing the mixture.

The metal oxide is capable of reducing into a metal at about 600° C. to about 800° C.

The metal oxide is reduced into metal or alloy thereof and volatilized to deposit on the olivine-type composite oxide, and it is present only on the surface of olivine-type composite oxide without forming other phase.

The metal oxide is selected from the group consisting of germanium oxide (GeO$_2$), zinc oxide (ZnO), gallium oxide (GaO$_2$), and a combination thereof. By using the metal oxide, the metal or the alloy thereof having a good conductivity is present on the surface of olivine-type composite oxide, and it provides a high electrical conductivity.

The firing temperature may be from about 600° C. to about 800° C., and the firing may be performed for about 8 hours to about 20 hours.

The firing may be performed under the reduction atmosphere, or it may be performed under the air after injecting a reducing agent.

The reduction atmosphere is to reduce the metal oxide into metal and may include, for example, hydrogen (H$_2$) gas.

The reducing agent may be selected from the group consisting of activated carbon, carbon monoxide (CO), hydrogen (H$_2$), and a combination thereof, but is not limited thereto.

The olivine-type composite oxide precursor may include lithium (Li) raw material, iron (Fe) raw material, and phosphoric acid (PO$_4$) raw material. The lithium raw material may be lithium carbonate, LiOH.2H$_2$O, LiNO$_3$, Li$_3$PO$_4$ or a combination thereof; and the iron raw material may be FeC$_2$O$_4$.2H$_2$O, FeSO$_4$.7H$_2$O, (NH$_4$)$_2$Fe(SO$_4$).6H$_2$O, Fe$_3$(PO$_4$)$_2$.8H$_2$O, FePO$_4$.2H$_2$O, or a combination thereof. The phosphoric acid raw material may be (NH$_4$)$_2$HPO$_4$, NH$_4$H$_2$PO$_4$, H$_3$PO$_4$, H$_3$PO$_3$ or a combination thereof. The mixing ratio of the lithium raw material, the iron material and the phosphoric acid may be controlled according to the desired composition.

The metal oxide may be included in about 3 parts by weight to about 40 parts by weight, for example, about 5 parts by weight to about 20 parts by weight based on total 100 parts by weight of the olivine-type composite oxide precursor.

When the metal oxide is included within the range, it may improve the electrical conductivity and suppress the particle diameter growth.

The olivine-type composite oxide may include lithium iron phosphate represented by the following Chemical Formula 2.

LiFePO$_4$ [Chemical Formula 2]

The method of manufacturing the positive active material for a rechargeable lithium battery may further include adding a carbon precursor material into the olivine-type composite oxide precursor together with the metal oxide.

The carbon precursor material may be selected from the group consisting of sucrose, glycol, glycerin, kerosene, and a combination thereof.

The rechargeable lithium battery according to another embodiment includes a positive electrode including the positive active material; a negative electrode including a negative active material; and an electrolyte.

Rechargeable lithium batteries may be classified as lithium ion batteries, lithium ion polymer batteries, and lithium polymer batteries according to the presence of a separator and the kind of electrolyte used in the battery. Rechargeable lithium batteries may have a variety of shapes and sizes, including cylindrical, prismatic, or coin-type batteries, and may also be a thin film or bulky type depending on its size.

FIG. 1 show a representative structure of a rechargeable lithium battery according to one embodiment. FIG. 1 illustrates a rechargeable lithium battery 100, which includes a negative electrode 112, a positive electrode 114, a separator 113 interposed between the negative electrode 112 and the positive electrode 114, an electrolyte (not shown) impregnating the separator 113, a battery case 120, and a sealing member 140 sealing the battery case 120. Such a rechargeable lithium battery 100 is fabricated by sequentially stacking the negative electrode 112, positive electrode 114, and separator 113, spiral-winding the resultant, and accommodating the spiral-wound body in the battery case 120.

The positive electrode 114 includes a positive active material layer and a current collector supporting the positive active material layer. The positive active material layer includes a positive active material.

The current collector may be aluminum (Al), but is not limited thereto.

The positive active material is as described above.

The positive active material layer may include a binder that improves binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, but is not limited thereto.

The positive active material layer may include a conductive material that improves electrical conductivity of a negative electrode. Any electrically conductive material may be used as a conductive agent unless it causes a chemical change. Examples of the conductive material may include carbon-based materials such as natural graphite, artificial graphite, carbon black, acetylene black, ketjen black, carbon fiber, or the like; metal-based materials including a metal powder or a metal fiber of copper, nickel, aluminum, or the like; conductive polymer materials such as polyphenylene derivatives; or mixtures thereof.

The negative electrode 112 includes a current collector and a negative active material layer disposed thereon. The negative active material layer includes a negative active material, a binder, or optionally a conductive material.

The current collector may be selected from the group consisting of a copper foil, a nickel foil, a stainless steel foil, a titanium foil, a nickel foam, a copper foam, a polymer substrate coated with a conductive metal, and combinations thereof.

The negative active material may include a material that reversibly intercalates/deintercalates lithium ions, a lithium metal, a lithium metal alloy, a material being capable of doping lithium, or a transition metal oxide.

The material that reversibly intercalates/deintercalates lithium cations is a carbon material, and any carbon-based negative active material generally used in a lithium cation rechargeable battery may be used, such as crystalline carbon, amorphous carbon, or a combination thereof. Examples of the crystalline carbon include graphite such as amorphous, sheet-type, flake-type, spherical, or fibrous natural graphite or artificial graphite, and examples of the amorphous carbon include soft carbon or hard carbon, mesophase pitch carbonized products, or fired coke.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping lithium include Si, $SiO_x$ ($0<x<2$), a Si-A alloy (wherein A is selected from the group consisting of an alkali metal, an alkaline-earth metal, a group 13 element, a group 14 element, a group 15 element, a group 16 element, a transition element, a rare earth element, and combinations thereof, and is not Si), Sn, $SnO_2$, a Sn-G alloy (wherein G is selected from the group consisting of an alkali metal, an alkaline-earth metal, a group 13 element, a group 14 element, a group 15 element, a group 16 element, a transition element, a rare earth element, and combinations thereof, and is not Sn), or mixtures thereof. At least one of these materials may be mixed with $SiO_2$. The elements A and G may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide, or the like.

The binder improves binding properties of negative active material particles with one another and with a current collector. Examples of the binder may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, or the like, but is not limited thereto.

The conductive material is included to improve electrode conductivity. Any electrically conductive material may be used as a conductive material unless it causes a chemical change. Examples of the conductive material include natural graphite, artificial graphite, carbon black, acetylene black, ketjen black, a carbon fiber, a metal powder or a metal fiber including copper, nickel, aluminum, silver, and so on, a polyphenylene derivative, or mixtures thereof.

The negative electrode 112 and the positive electrode 114 may be fabricated by a method including mixing an active material, a binder, or the like in a solvent to prepare an active material composition, and coating the composition on a current collector. The solvent includes N-methylpyrrolidone and the like, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. Examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, or the like. Examples of the ether-based solvent may include dibutyl ether, tetraglyme, diglyme, 1,2-dimethoxyethane, 1,2-diethoxyethane, ethoxymethoxyethane, 2-methyltetrahydrofuran, tetrahydrofuran, or the like. Examples of the ketone-based solvent may include cyclohexanone or the like. Examples of the alcohol-based solvent may include ethanol, isopropyl alcohol, or the like, and examples of the aprotic solvent include nitriles such as R—CN (wherein R is a $C_2$ to $C_{20}$ linear, branched, or cyclic hydrocarbon, a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio can be controlled in accordance with desirable battery performance.

The carbonate-based solvent may include a mixture of a cyclic carbonate and a linear carbonate. The cyclic carbonate and the linear carbonate are mixed together in the volume ratio of about 1:1 to about 1:9, and when the mixture is used as an electrolyte, the electrolyte performance may be enhanced.

In addition, the electrolyte of the present embodiments may further include mixtures of carbonate-based solvents and aromatic hydrocarbon-based solvents. The carbonate-based solvents and the aromatic hydrocarbon-based solvents are preferably mixed together in the volume ratio of about 1:1 to about 30:1.

The aromatic hydrocarbon-based organic solvent may be represented by the following Chemical Formula 3.

[Chemical Formula 3]

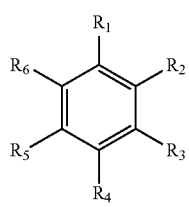

In Chemical Formula 3, $R_1$ to $R_6$ are independently selected from the group consisting of hydrogen, a halogen, a $C_1$ to $C_{10}$ alkyl, a $C_1$ to $C_{10}$ haloalkyl, and combinations thereof.

The aromatic hydrocarbon-based organic solvent may include, but is not limited to, at least one selected from benzene, fluoro benzene, 1,2-difluoro benzene, 1,3-difluoro benzene, 1,4-difluoro benzene, 1,2,3-trifluoro benzene, 1,2,4-trifluoro benzene, chloro benzene, 1,2-dichloro benzene, 1,3-dichloro benzene, 1,4-dichloro benzene, 1,2,3-trichloro benzene, 1,2,4-trichloro benzene, iodo benzene, 1,2-diiodo benzene, 1,3-diiodo benzene, 1,4-diiodo benzene, 1,2,3-triiodo benzene, 1,2,4-triiodo benzene, toluene, fluoro toluene, 1,2-difluoro toluene, 1,3-difluoro toluene, 1,4-difluoro toluene, 1,2,3-trifluoro toluene, 1,2,4-trifluoro toluene, chloro toluene, 1,2-dichloro toluene, 1,3-dichloro toluene, 1,4-dichloro toluene, 1,2,3-trichloro toluene, 1,2,4-trichloro toluene, iodo toluene, 1,2-diiodo toluene, 1,3-diiodo toluene, 1,4-diiodo toluene, 1,2,3-triiodo toluene, 1,2,4-triiodo toluene, xylene, and a combination thereof.

The non-aqueous electrolyte may further include vinylene carbonate or an ethylene carbonate-based compound of the following Chemical Formula 4.

[Chemical Formula 4]

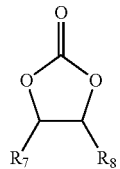

In Chemical Formula 4, $R_7$ and $R_8$ are independently hydrogen, a halogen, a cyano group (CN), a nitro group ($NO_2$), and a $C_1$ to $C_5$ fluoroalkyl group, provided that at least one of $R_7$ and $R_8$ is a halogen, a nitro group ($NO_2$), or a $C_1$ to $C_5$ fluoroalkyl group and $R_7$ and $R_8$ are not simultaneously hydrogen.

The ethylene carbonate-based compound includes difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The use amount of the additive for improving cycle life may be adjusted within an appropriate range.

The lithium salt supplies lithium ions in the battery, and operates a basic operation of a rechargeable lithium battery and improves lithium ion transport between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, and $LiB(C_2O_4)_2$ (lithium bis(oxalato) borate, LiBOB). The lithium salt may be used at about a 0.1 to about 2.0 M concentration. When the lithium salt is included at the above concentration range, electrolyte performance and lithium ion mobility may be enhanced due to optimal electrolyte conductivity and viscosity.

The rechargeable lithium battery may further include a separator between a negative electrode and a positive electrode, as needed. Examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, the embodiments are illustrated in more detail with reference to examples. These examples, however, should not in any sense be interpreted as limiting the scope of the present embodiments.

Furthermore, what is not described in this specification can be sufficiently understood by those who have knowledge in this field and will not be illustrated here.

Preparation of Positive Active Material

Example 1

Li$_2$CO$_3$ as a Li raw material, FeC$_2$O$_4$.2H$_2$O as a Fe raw material of, and (NH$_4$)$_2$HPO$_4$ as a P raw material are mixed in a solvent of water in a weight ratio of 11:38:51 to provide a LFP precursor mixture. Germanium oxide (GeO$_2$) powder is added in the LFP precursor mixture in about 5 parts by weight based on 100 parts by weight of the LFP precursor mixture, and then it is fired at about 700° C. for about 10 hours under the 5-volume % of H$_2$ atmosphere (a mixture of 5 volume % H$_2$ and 95 volume % of N$_2$) to provide a positive active material that germanium (Ge) metal is adhered to the surface of iron lithium phosphate (LiFePO$_4$).

Comparative Example 1

A positive active material that a carbon material is adhered to the surface of lithium iron phosphate (LiFePO$_4$) is prepared in accordance with the same procedure as in Example 1, except that sucrose is added into the LFP precursor mixture instead of germanium oxide (GeO$_2$) powder.

Fabrication of Rechargeable Lithium Battery Cell

Each positive active material obtained from Example 1 and Comparative Example 1 is mixed with a bonder of polyvinylidene fluoride (PVDF) and a conductive material of carbon black in a weight ratio of 96:2:2 and dispersed in a N-methyl-2-pyrrolidone (NMP) to provide a positive active material slurry. Each positive active material slurry is coated on an aluminum foil (positive electrode current collector) in a thickness of 20 μm and dried and compressed to provide a positive electrode.

A mixture of natural graphite and artificial graphite (50 wt %:50 wt %) is used as a negative active material; a polyvinylidene fluoride (PVDF) is used as a bonder, and a carbon black is used as a conductive material. They are mixed in a weight ratio of about 96:2:2 and dispersed in N-methyl-2-pyrrolidone (NMP) to provide a negative active material slurry. The negative active material slurry is coated on a copper foil (negative electrode current collector) in a thickness of 15 μm and dried and compressed to provide a negative electrode.

Using the obtained positive electrode and negative electrode, a separator of polyethylene material, and an electrolyte, they are wound and compressed to provide a rechargeable lithium battery that a laminated rechargeable lithium battery has a 1 C capacity of 1,200 mAh, according to Example 1 (Preparation Example 1) and Comparative Example 1 (Preparation Example 2). The electrolyte is prepared by mixing a lithium salt of 1.15M of LiPF$_6$ with a solvent that ethylene carbonate (EC), ethylmethyl carbonate (EMC), and diethyl carbonate (DEC) are mixed in a volume ratio of 3:6:1.

Table 1 shows the results of rate capability of the rechargeable lithium batteries using positive active materials according to Example 1 and Comparative Example 1; and Table 2 shows the results of conductivity of rechargeable lithium batteries using positive active materials according to Example 1 and Comparative Example 1.

TABLE 1

|  | 0.1C(mAh/g) | 1C(mAh/g) | 5C(mAh/g) |
|---|---|---|---|
| Comparative Example 1 | 80 | 65 | 50 |
| Example 1 | 140 | 120 | 100 |

TABLE 2

|  | Conductivity (S/m) 4 kN | Conductivity (S/m) 12 kN |
|---|---|---|
| Comparative Example 1 | 4*10$^{-9}$ | 8*10$^{-9}$ |
| Example 1 | 3*10$^{-1}$ | 5*10$^{-1}$ |

While this disclosure has been described in connection with what is presently considered to be practical example embodiments, it is to be understood that the embodiments are not limited to the disclosed embodiments, but, on the contrary, is intended to cover various modifications and equivalent arrangements included within the spirit and scope of the appended claims. Therefore, the aforementioned embodiments should be understood to be examples but not limiting in any way.

What is claimed is:

1. A positive active material incorporated into a rechargeable lithium battery, comprising
a composite oxide comprising two or more metals; and
germanium (Ge) metal, gallium (Ga) metal, or a combination thereof adhered to a surface of the composite oxide,
wherein the composite oxide is represented by the following Chemical Formula 1:

Li$_x$M$_y$M'$_z$XO$_{4-w}$A$_w$    [Chemical Formula 1]

wherein, in Chemical Formula 1,
M and M' are independently selected from the group consisting of iron (Fe), aluminum (Al), boron (B), cobalt (Co), chromium (Cr), copper (Cu), gallium (Ga), germanium (Ge), hafnium (Hf), magnesium (Mg), manganese (Mn), molybdenum (Mo), niobium (Nb), nickel (Ni), tin (Sn), titanium (Ti), vanadium (V), zinc (Zn), zirconium (Zr), and a combination thereof,
X is selected from the group consisting of phosphorus (P), arsenic (As), bismuth (Bi), molybdenum (Mo), antimony (Sb), and a combination thereof,
A is selected from the group consisting of fluorine (F), sulfur (S), and a combination thereof, and
$0 < x \leq 1.3$, $0 \leq y \leq 1$, $0 < z \leq 1$, $0 < x+y+z \leq 2$, and $0 \leq w \leq 0.5$.

2. The positive active material incorporated into the rechargeable lithium battery of claim 1, wherein the composite oxide comprises lithium iron phosphate represented by the following Chemical Formula 2

LiFePO$_4$.    [Chemical Formula 2]

3. The positive active material incorporated into the rechargeable lithium battery of claim 1, further comprising a carbon coating layer on the surface of the positive active material.

4. The positive active material incorporated into the rechargeable lithium battery of claim 3, wherein the carbon coating layer comprises at least one selected from the group consisting of carbon nanotube, carbon nanorod, carbon nanowire, denka black, ketjen black, and a combination thereof.

* * * * *